United States Patent
Arnault et al.

(10) Patent No.: US 10,663,002 B2
(45) Date of Patent: May 26, 2020

(54) BALL BEARING, CLUTCH THRUST BEARING DEVICE INCLUDING SUCH A BEARING, AND DRIVELINE SYSTEM INCLUDING SUCH A DEVICE

(71) Applicant: Aktiebolaget SKF, Gothenburg (SE)

(72) Inventors: Benoit Arnault, Saint-Cyr-Sur-Loire (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/160,093

(22) Filed: Oct. 15, 2018

(65) Prior Publication Data
US 2019/0219100 A1   Jul. 18, 2019

(30) Foreign Application Priority Data
Jan. 18, 2018   (DE) .......... 10 2018 200 783

(51) Int. Cl.
*F16C 33/58*   (2006.01)
*F16C 19/16*   (2006.01)
*F16C 33/62*   (2006.01)
*F16D 25/08*   (2006.01)

(52) U.S. Cl.
CPC .......... *F16C 33/585* (2013.01); *F16C 19/163* (2013.01); *F16C 33/581* (2013.01); *F16C 33/586* (2013.01); *F16C 33/62* (2013.01); *F16D 25/083* (2013.01); *F16D 25/087* (2013.01); *F16C 2361/43* (2013.01)

(58) Field of Classification Search
CPC .... F16C 33/581; F16C 33/585; F16C 33/586; F16C 33/62; F16C 19/163; F16C 2361/43; F16D 25/08; F16D 25/082; F16D 25/083; F16D 25/087; F16D 25/12
See application file for complete search history.

(56) References Cited

U.S. PATENT DOCUMENTS

| | | | | |
|---|---|---|---|---|
| 3,741,361 A | * | 6/1973 | Brandenstein | ........ F16D 23/146 |
| | | | | 192/110 B |
| 2002/0014385 A1 | * | 2/2002 | Grosspietsch | .......... F16D 21/06 |
| | | | | 192/48.8 |
| 2016/0116050 A1 | * | 4/2016 | Arnault | ................. F16C 19/166 |
| | | | | 474/199 |

* cited by examiner

*Primary Examiner* — Jacob S. Scott
(74) *Attorney, Agent, or Firm* — Garcia-Zamor Intellectual Property Law, LLC; Ruy Garcia-Zamor; Bryan Peckjian

(57) ABSTRACT

A ball bearing includes a fixed inner ring able to bear against an axially movable piston, a rotatable outer ring, and one series of balls between the fixed inner ring and the rotatable outer ring. The rotatable outer ring also includes a folded portion able to bear against a resilient biasing member. The ball bearing can be integrated into a clutch thrust bearing device. The clutch thrust bearing device can be integrated into a driveline system. The driveline system can be included in an all-wheel drive driveline system of a motor vehicle.

9 Claims, 1 Drawing Sheet

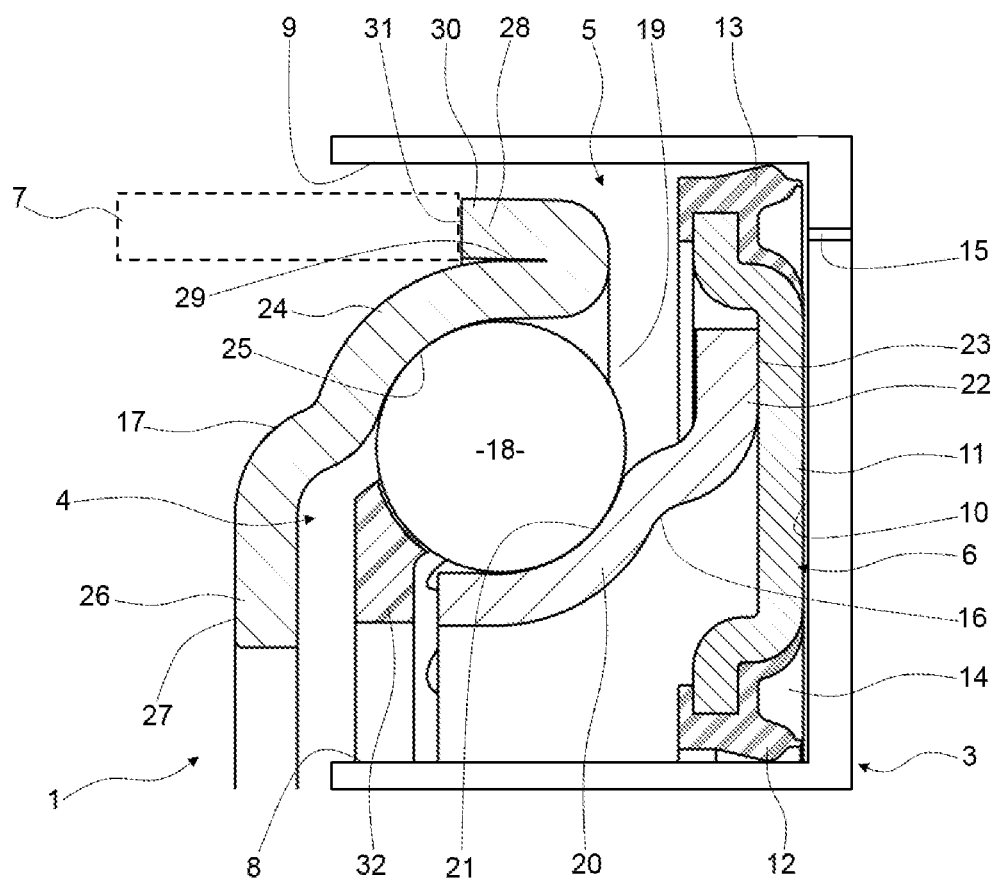

BALL BEARING, CLUTCH THRUST BEARING DEVICE INCLUDING SUCH A BEARING, AND DRIVELINE SYSTEM INCLUDING SUCH A DEVICE

CROSS-REFERENCE TO PRIORITY APPLICATION

This application claims priority to German patent application no. 102018200783.7 filed on Jan. 18, 2018, the contents of which are fully incorporated herein by reference.

TECHNICAL FIELD OF THE PRESENT INVENTION

The present invention relates to a ball bearing and to a clutch thrust bearing device including such a bearing. The invention also relates to a driveline system including such a device, the system being provided to an all-wheel drive driveline system of a motor vehicle.

BACKGROUND

An all-wheel drive driveline system for a motor vehicle generally comprises a primary front drive axle coupled to a secondary or rear drive axle.

When only two wheels of a four-wheel vehicle operate as driving wheel, the rear drive system including the rear drive axle and rear wheels may be disconnected from the front drive system including the front drive axle and front wheels. Furthermore, it could be desirable to disconnect only one of or both rear wheels depending on the operation mode of the motor vehicle.

For this purpose, it is known to provide a rear drive module to the rear drive system, the rear drive module including clutch thrust devices to distribute torque between the front and rear axle, and between the two wheels. Clutch thrust devices are also able to disconnect the rear drive system, the wheel being uncoupled to driveline. It is also known rear drive modules including two clutches, each of the clutches being able to disconnect one rear wheel from the driveline.

Such rear drive modules enable a motor vehicle with off-road capabilities, and on-road high performances, in particular with efficient stability, efficient dynamic operation, and also low fuel consumption.

Advantageously, the clutch thrust devices are of the well-known multi-plate types and include an axially movable piston disposed within a cavity between a clutch bearing and a housing, the piston cavity being connected to a source of hydraulic fluid which may variably provide pressurized fluid in the cavity to axially move the piston. Clutch thrust devices further include a resilient biasing member exerting an axial preload onto the clutch bearing. The clutch bearing is able to axially move by the piston movement and then actuates a coupling member engaging the plates. It is known to use a clutch bearing with a plurality of needles.

It is desirable to further improve the performances of such rear drive module, in particular by limiting the friction torque within the module and in particular in the clutch bearing to further reduce the vehicle fuel consumption.

BRIEF SUMMARY OF THE PRESENT INVENTION

The aim of the invention is to overcome these drawbacks by proposing a ball bearing, in particular for use in a rear drive module of a driveline system of a motor vehicle, able to transmit an axial force from an axially movable piston to a resilient biasing member, of reduced friction torque, and of easy and low-cost manufacturing process.

To this end, the invention relates to a ball bearing comprising a fixed inner ring, a rotatable outer ring, and one series of balls located in a raceway chamber defined between the rings. The fixed inner ring comprises a toroidal portion of outside toroidal surface forming an inner raceway for the balls, and a radial portion that outwardly radially extends from the toroidal portion, the radial portion having an axial contact surface able to bear against an axially movable piston. The rotatable outer ring comprises a toroidal portion of inner toroidal surface forming an outer raceway for the balls.

According to the invention, the rotatable outer ring further comprises a folded portion. Folded portion axially extends from outer side of the toroidal portion and is folded towards an outer surface of the toroidal portion axially opposite to the outer raceway. Folded portion is provided with a free end having an axial contact surface able to bear against a resilient biasing member.

According to further aspects of the invention which are advantageous but not compulsory, such a ball bearing may incorporate one or several of the following features:

- The ball bearing further comprises an annular cage comprising a plurality of pockets that receive each a ball.
- The rotatable outer ring further comprises a radial portion that inwardly radially extends from inner side of the toroidal portion.
- The folded portion is annular.
- The folder portion is discrete and comprises a plurality of folded tongues, free ends of the tongues having each an axial contact surface able to bear against a resilient biasing member.
- Folded portion is folded in direct contact onto an outer surface of the toroidal portion axially opposite to the outer raceway.
- The inner ring and the outer ring are made of tempered steel.

The invention also relates to a clutch thrust bearing device comprising an axially movable piston disposed within a cavity between a housing and the ball bearing according to any of the previous embodiments, the piston cavity being connected to a source of hydraulic fluid which may variably provide pressurized fluid in the cavity to axially move the piston, a resilient biasing member exerting an axial preload onto the ball bearing, the ball bearing being able to axially move by the piston movement and then compressing the resilient biasing member that actuates a coupling member engaging plates.

Advantageously, the resilient biasing member is a wavy spring.

The invention also relates to a driveline system of a motor vehicle comprising such a clutch thrust bearing device according to the invention for selectively connecting or disconnecting at least one wheel from the driveline system.

Advantageously, the driveline system comprises a front drive system including a front drive axle and front wheels, and a rear drive system including a rear drive axle, a rear drive module and rear wheels, the rear drive module being provided with clutch thrust bearing devices according to the invention in series, each being able to selectively connect or disconnect one of the rear wheels.

BRIEF DESCRIPTION OF THE DRAWING

The invention will now be explained in correspondence with the annexed unique FIGURE, as illustrative example, without restricting the object of the invention. The FIGURE is an axial section of a clutch thrust bearing device comprising a ball bearing according the invention.

DETAILED DESCRIPTION OF THE PRESENT INVENTION

The clutch thrust bearing device 1 is advantageously integrated in a driveline system of a motor vehicle, not represented. The clutch thrust bearing device 1 is essentially annular and centered on a central axis.

The clutch thrust bearing device 1 comprises a fixed housing 3, a ball bearing 4, the fixed housing 3 and ball bearing 4 defining a cavity 5 wherein an axially movable piston 6 is arranged, and a resilient biasing member 7 shown by way of a dot-dashed line, for example a wavy spring.

The housing 3 is fixed, and advantageously is a part of a rear drive module provided to the driveline system. The housing comprises an annular cavity 5 centered on the central axis. The cavity 5 is defined between two lateral walls 8, 9, and a bottom surface 10; the cavity 5 being axially open to the ball bearing 4.

The piston 6 is annular, is centered on the central axis, and is arranged within the cavity 5 of housing 3. The piston 6 comprises a substantially radial portion 11 extending radially between the two lateral walls 8, 9 of cavity 5. Advantageously, the piston 6 further comprises inner sealing means 12 provided to inner bore of radial portion 11, the sealing means being provided with a sealing lip in sliding contact with the lateral wall 8 of cavity 5. The piston also comprises outer sealing means 13 provided to outer side of radial portion 11, the sealing means being provided with a sealing lip in sliding contact with the lateral wall 9 of cavity 5.

The piston 6, the lateral walls 8 and 9 and the bottom surface 10, collectively define a sealed cavity 14. At least one channel 15 is provided through the housing 3 so as to connect the sealed cavity 14 with a source of hydraulic fluid (not represented) which may variably provide pressurized fluid in the sealed cavity 14 to axially move the piston 6.

In the present embodiment, the substantially radial portion 11 of piston 6 has a shape adapted to the ball bearing 4. Alternatively, the substantially radial portion 11 may have any other suitable shape.

The ball bearing 4 is annular and centered on the central axis. The ball bearing 4 is at least partly arranged in the cavity 5 of housing 3, the piston 6 being axially interposed between the bottom surface 11 of the cavity 5 and the ball bearing 4. The lateral walls 8, 9 of cavity 5 permit the lateral guidance of the ball bearing 4.

The ball bearing 4 comprises a fixed inner ring 16, a rotatable outer ring 17, and one series of balls 18 located in a raceway chamber 19 defined between the rings 16, 17. A ball bearing 4 provided with balls 18 as rolling elements between rings 16, 17 is of reduced friction torque compared to other types of rolling bearings, provided with rollers or needles.

The fixed inner ring 16 comprises a toroidal portion 20 of outside toroidal surface 21 forming an inner raceway for the balls 18, and a radial portion 22 that outwardly radially extends from the toroidal portion 20. The radial portion 22 has an axial contact surface 23 bearing against the axially movable piston 6. The ball bearing 4 is set in axial movement by the transmission of the movement of piston 6 to the axial contact surface 23 of fixed inner ring 16.

The rotatable outer ring 17 comprises a toroidal portion 24 of inner toroidal surface 25 forming an outer raceway for the balls 18.

Advantageously, the rotatable outer ring 17 further comprises a radial portion 26 that outwardly radially extends from an inner side of the toroidal portion 24. The radial portion 26 has an axial contact surface 27.

Moreover, the contact surface 27 forms an abutting surface to limit the maximum amount of axial displacement of the ball bearing 4. A radial portion 26 of the rotatable outer ring 17 prevents the escape of ball bearing 4 from the cavity 5. The sealed cavity 14 is provided with pressurized fluid.

According to the invention, the rotatable outer ring 17 further comprises a folded portion 28. The folded portion 28 axially extends from outer side of the toroidal portion 24. In the present embodiment, the portion 28 is folded in direct contact onto an outer surface 29 of the toroidal portion 24 axially opposite to the outer raceway 25. Alternatively, the portion 28 is folded towards outer surface 29, so as to leave a clearance between them.

The folded portion 28 is provided with a free end 30 having an axial contact surface 31 bearing against the resilient biasing member 7. The axial movement of the piston 6 can be transferred into the compression of the resilient biasing member 7 by the intermediate of the axial contact surface 23 of fixed inner ring 16, the balls 18, and the axial contact surface 31 of the folded portion 28 of outer ring 17, successively.

According to one embodiment of the invention, the folded portion 28 is annular. According to an alternate embodiment, the folded portion is discrete and is provided with a plurality of folded tongues, each of the tongues being provided an end having an axial contact surface bearing against the resilient biasing member.

Advantageously, the inner ring 16 and the outer ring 17 are made of tempered steel. The rings 16, 17 are advantageously stamped from a metal blank sheet and are of simple and cost effective construction. The clutch thrust bearing device does not require additional element or elements of complex shape to ensure the connection and disconnection functions. The clutch thrust bearing device 1 works as followed:

The axial movement of the piston 6 is transferred to the ball bearing 4, and the connection/disconnection of the rear drive module to the driveline system is actuated by the supplying of pressurized fluid in the sealed chamber 14.

When pressurized fluid in supplied in the sealed chamber 14 through channel 15 of housing 3, the piston 6 is pushed by the fluid. Piston 6 transmits a forward axial movement to the ball bearing 4 by the intermediate of contact surface 23 of inner ring 16. Contact surface 27 of outer ring 17 actuates a coupling member (not shown) that engages plates (not shown) to connect one wheel to the driveline system of the vehicle. The resilient biasing member 7 is axially compressed by the ball bearing 4 axial forward movement, by the intermediate of the contact surface 31 of folded portion 28 of outer ring 17.

When pressurized fluid is not supplied anymore to the sealed chamber 14, the resilient biasing member 7 pushes the ball bearing 4 into a backward axial movement, by the intermediate of the surface 31 of folded portion 28. The contact surface 27 of outer ring 17 does not actuate anymore the coupling member to disconnect one wheel to the driveline system. The piston 6 is pushed back to its initial position by the intermediate of contact surface 23 of inner ring 16, the fluid in sealed chamber 14 being removed through channel 15.

Advantageously, the ball bearing 4 further comprises an annular cage 32 comprising a plurality of pockets that receive each a ball 18. Balls 18 are then circumferentially equally spaced and held.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball bearing.

Moreover, various features of the above-described representative examples, as well as the various independent and dependant claims below, may be combined in ways that are not specifically and explicitly enumerated in order to provide additional useful embodiments of the present teachings.

What is claimed is:

1. A ball bearing comprising:
    a fixed inner ring including an inner ring toroidal portion which forms an inner raceway for balls, and an inner ring radial portion that outwardly radially extends from the inner ring toroidal portion, the inner ring radial portion having an axial contact surface designed to bear against an axially movable piston;
    a rotatable outer ring having an outer ring toroidal portion forming an outer raceway for balls, a folded portion axially extending from an outer side of the outer ring toroidal portion and being folded towards an outer surface of the outer ring toroidal portion axially opposite to the outer raceway, the folded portion being provided with a free end having an axial contact surface able to bear against a resilient biasing member; and
    one series of balls located in a raceway chamber defined between the inner raceway and the outer raceway.

2. The ball bearing according to claim 1, the rotatable outer ring further comprising an outer ring radial portion that extends radially inward from an inner side of the outer ring toroidal portion.

3. The ball bearing according to claim 1, wherein the folded portion is annular.

4. The ball bearing according to claim 1, wherein the folded portion is discrete and comprises a plurality of folded tongues, free ends of the tongues each having an axial contact surface able to bear against the resilient biasing member.

5. The ball bearing according to claim 1, wherein the fixed inner ring and the rotatable outer ring are made of tempered steel.

6. A clutch thrust bearing device comprising:
    a housing,
    a ball bearing comprising:
        a fixed inner ring including an inner ring toroidal portion forming an inner raceway for balls, and an inner ring radial portion that outwardly radially extends from the inner ring toroidal portion, the inner ring radial portion having an axial contact surface designed to bear against an axially movable piston,
        a rotatable outer ring having an outer ring toroidal portion forming an outer raceway for balls, a folded portion axially extending from an outer side of the outer ring toroidal portion and being folded towards an outer surface of the outer ring toroidal portion axially opposite to the outer raceway, the folded portion being provided with a free end having an axial contact surface able to bear against a resilient biasing member, and
        one series of balls located in a raceway chamber defined between the inner raceway and the outer raceway;
    an axially movable piston disposed within a cavity between the housing and the ball bearing, the piston cavity being connected to a source of hydraulic fluid which may variably provide pressurized fluid in the cavity to axially move the piston, and
    the resilient biasing member exerting an axial preload onto the ball bearing, the ball bearing being able to axially move by the piston movement and then compressing the resilient biasing member that actuates a coupling member engaging plates.

7. The clutch thrust bearing device according to claim 6, wherein the resilient biasing member is a wavy spring.

8. The clutch thrust bearing device according to claim 6, wherein the clutch thrust bearing device is incorporated into a driveline system of a motor vehicle for selectively connecting or disconnecting at least one wheel from the driveline system.

9. The clutch thrust bearing device according to claim 8, wherein the clutch thrust bearing is integrated into a driveline system, the driveline system comprising:
    a front drive system including a front drive axle and front wheels, and
    a rear drive system including a rear drive axle, a rear drive module and rear wheels, wherein the rear drive module is provided in series with the clutch thrust bearing device, the clutch thrust bearing device being able to selectively connect or disconnect one of the rear wheels.

* * * * *